(12) United States Patent
Islam et al.

(10) Patent No.: US 8,666,400 B2
(45) Date of Patent: Mar. 4, 2014

(54) SYSTEM AND METHOD FOR WIRELESS NETWORK SELECTION BY MULTI-MODE DEVICES

(75) Inventors: Muhammad Khaledul Islam, Ottawa (CA); Asif Hossain, San Jose, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/332,757

(22) Filed: Dec. 21, 2011

(65) Prior Publication Data
US 2012/0087362 A1    Apr. 12, 2012

Related U.S. Application Data

(63) Continuation of application No. 11/684,276, filed on Mar. 9, 2007, now Pat. No. 8,107,954.

(51) Int. Cl.
*H04W 4/00*   (2009.01)
(52) U.S. Cl.
USPC .... 455/434; 455/435.2; 455/90.1; 455/422.1; 455/435.1; 455/432.2; 455/553.1; 455/552.1
(58) Field of Classification Search
USPC ............... 455/434, 435.2, 90.1, 422.1, 435.1, 455/432.2, 553.1, 426, 552.1
See application file for complete search history.

(56) References Cited

U.S. PATENT DOCUMENTS

| | | | |
|---|---|---|---|
| 2003/0039237 A1* | 2/2003 | Forslow | 370/352 |
| 2004/0039817 A1* | 2/2004 | Lee et al. | 709/225 |
| 2004/0058679 A1 | 3/2004 | Dillinger et al. | |
| 2005/0037755 A1* | 2/2005 | Hind et al. | 455/435.3 |
| 2006/0234705 A1* | 10/2006 | Oommen | 455/435.3 |
| 2007/0042775 A1 | 2/2007 | Umatt et al. | |

FOREIGN PATENT DOCUMENTS

| | | |
|---|---|---|
| WO | 0237874 A1 | 5/2002 |
| WO | 2005117463 A2 | 12/2005 |

OTHER PUBLICATIONS

EP application No. 11164264.1, Extended European Search Report dated Jul. 25, 2011.

* cited by examiner

*Primary Examiner* — Manpreet Matharu
(74) *Attorney, Agent, or Firm* — Moffat & Co.

(57) ABSTRACT

Systems and methods are provided for wireless network selection by multi-mode devices. A mobile device maintains an indication of any wireless network services currently provided to the mobile device. According to an embodiment of the application, the mobile device automatically scans for both GSM wireless networks and CDMA wireless networks in order to acquire a wireless network that can provide a service that is not currently provided to the mobile device. Therefore, the mobile device avoids partial service or limited service when better service is available.

20 Claims, 11 Drawing Sheets

| Last RAT | System Info | Service | Collocated Status | Timestamp | Duration |
|---|---|---|---|---|---|
| GSM | MCC+MNC | CS+PS | $c_1$ | $t_1$ | $d_1$ |
| GSM | MCC+MNC | CS only | $c_2$ | $t_2$ | $d_2$ |
| CDMA | (MCC+MNC)/ (SID+NID) | CS+PS | $c_3$ | $t_3$ | $d_3$ |

SYSTEM AND METHOD FOR WIRELESS NETWORK SELECTION BY MULTI-MODE DEVICES

RELATED APPLICATIONS

The present application is a continuation of U.S. patent application Ser. No. 11/684,276, filed Mar. 9, 2007 now U.S. Pat. No. 8,107,954, the entire contents of which are incorporated herein by reference.

FIELD OF THE APPLICATION

The application relates to wireless communication, and more particularly to mobile devices supporting multi modes, such as CDMA (Code Division Multiple Access) and GSM (Global System for Mobile Communications).

BACKGROUND

Wireless communication systems may be based on Code Division Multiple Access (CDMA), Time Division Multiple Access (TDMA), Frequency Division Multiple Access (FDMA) or some other multiple access schemes. A CDMA-based wireless network may implement one or more standards such as 3GPP2 IS-2000 (commonly referred to as CDMA 1x), 3GPP2 IS-856 (commonly referred to as CDMA 1xEV-DO), and 3GPP UMTS (Universal Mobile Telecommunications System). A TDMA/FDMA-based wireless network may implement one or more standards such as 3GPP Global System for Mobile Communications (GSM). 3GPP General Packet Radio Service (GPRS) is an extension of GSM to provide packet data service. A radio access technology (RAT) indicates the type of radio technology to access the associated wireless core network. Examples of RATs include CDMA 1x or CDMA 1xEV-DO (collectively referred to as CDMA from hereafter), GSM, and UMTS. A CDMA core wireless network may include a Mobile Switching Centre (MSC), a Home Location Register (HLR), an Access Authorization and Accounting (AAA) Server, a Home Agent (HA) and a Foreign Agent (FA). A GSM core wireless network may include a Mobile Switching Centre (MSC), a Home Location Register (HLR), a Serving GPRS Support Node (SGSN) and a Gateway GPRS Support Node GGSN.

Each of the systems is used to provide wireless radio coverage in a given geographical area as defined by the wireless network operators who own the radio spectrum and the access technology. In some areas, only one radio access technology is available. In other areas, multiple radio access technologies are available. To allow for more comprehensive roaming, mobile devices have been implemented that support multiple RATs.

A mobile device supporting both GSM and CDMA faces a number of challenges in terms of scanning, acquisition, and selection of a proper wireless network of a given RAT. Multiple RAT acquisition cannot take place simultaneously on a mobile device that has a single receiver. It becomes even more challenging if the device is to provide a "global" wireless network scan mode that automatically selects a RAT (CDMA or GSM) that provides preferred service (based on primary services expected of the mobile device) without any user intervention. Main factors behind these problems are summarized below.

To acquire a CDMA wireless network, mobile device uses an operator-provided list called Preferred Roaming List (PRL) that controls the CDMA systems that the mobile device can acquire as well as the priority order associated with each system. Similarly, GSM system acquisition is controlled by operator provided Public Land Mobile Network (PLMN) list that resides in the Subscriber Identity Module (SIM). Currently, no mechanism exists to combine network information associated with CDMA and GSM. In other word, the PRL used for CDMA scanning and the PLMN list used for GSM scanning are quite disjoint. As a result, the mobile device has no a-priori knowledge of whether there is a GSM/CDMA overlay in a given geographical area and whether the mobile device can acquire services using either of GSM and CDMA or both.

Roaming agreements between a home wireless network operator and its roaming partners do not necessarily converge on using the same RAT due a variety of reasons which can be broadly categorised as financial (e.g. cost of roaming, revenue sharing) or technical (lack of same RAT support). A CDMA carrier "X", may have both voice and data roaming agreement with another CDMA wireless network operator "Y" in country "A". However, same CDMA carrier "X" may have only voice roaming with CDMA wireless network operators in country "B" whereas it may have both voice and data roaming with a GSM carrier "Z" in country "B". In country "C", there may not be any systems that use CDMA—as a result, the viable option for roaming device from operator "X" is to use GSM service provided that "X" has roaming agreement with a GSM operator in country "C". In addition, roaming based on business agreements and as a result subject to change at any time.

BRIEF DESCRIPTION OF THE DRAWINGS

Embodiments will now be described with reference to the attached drawings in which.

DETAILED DESCRIPTION OF EMBODIMENTS

Current implementations of mobile devices supporting both GSM and CDMA try to acquire a given air interface without any intelligence, which can cause unnecessary delay or disruption of service. There is no intelligence in terms of multi-mode scanning during initial acquisition or system loss. In some cases, mobile device may get stuck in one RAT and may not even search for an alternate RAT even if the device is within a coverage area of an alternate RAT. One such example is limited service mode in GSM. Upon entering such mode, the mobile device refrains from registering with the current GSM wireless network and periodically search for other available GSM systems to get full service. However, it does not search for an alternate CDMA RAT that may exist in the area and may provide full service. If the mobile device gets some level of service in a visiting wireless network of a given RAT, it performs a periodic scan to find a more preferred system. However, periodic scanning for a more preferred system is also limited to the currently acquired RAT. In addition, system acquisition does not take into account primary service expected of the mobile device as neither PRL nor PLMN list provides any information regarding service availability (such as voice, data, voice and data etc.). As a result, a CDMA/GSM dual-mode mobile device that is supposed to provide voice and packet data service to the end user may end up staying on a voice-only CDMA wireless network and be totally oblivious of the fact that there may be a GPRS wireless network that could have provided both voice and data and vice versa. Because of all these reasons, currently available dual mode CDMA/GSM mobile devices do not provide a "global" scan mode. Instead, the user manually sets it to CDMA-only or GSM-only mode.

According to a broad aspect of the application, there is provided a method in a mobile device comprising: maintaining an indication of wireless network services, if any, currently provided to the mobile device; automatically determining whether to scan for a wireless network based on at least the indication of wireless network services; and if it has been determined to scan for a wireless network, automatically scanning for both GSM wireless networks and CDMA wireless networks in order to acquire a wireless network that can provide a service that is not currently provided to the mobile device; wherein automatically scanning for both GSM wireless networks and CDMA wireless networks comprises: scanning for a GSM core wireless network; and scanning for a CDMA core wireless network.

According to another broad aspect of the application, there is provided a computer readable medium having computer executable instructions stored thereon for execution on a processor so as to implement the method summarized above.

According to a broad aspect of the application, there is provided a mobile device comprising: a wireless access radio operable to communicate with wireless networks; and a RAT selection function operable to: (a) maintain an indication of wireless network services, if any, currently provided to the mobile device; and (b) automatically determine whether to scan for a wireless network based on at least the indication of wireless network services; and (c) if it has been determined to scan for a wireless network, automatically scan for both GSM networks and CDMA wireless networks in order to acquire a wireless network that can provide a service that is not currently provided to the mobile device; wherein automatically scanning for both GSM wireless networks and CDMA wireless networks comprises scanning for a GSM core wireless network and scanning for a CDMA core wireless network.

Mobile Device

Figure 1A:
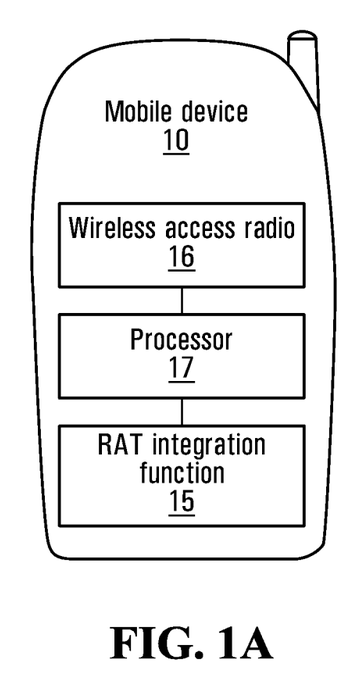
FIG. 1A is a block diagram of an example mobile device.

Referring now to FIG. 1A, shown is a block diagram of an example mobile device 10. The mobile device 10 has a wireless access radio 16, a processor 17, and a RAT integration function 15; the mobile device 10 may have other components, but they are not shown for sake of simplicity.

Figure 1B:
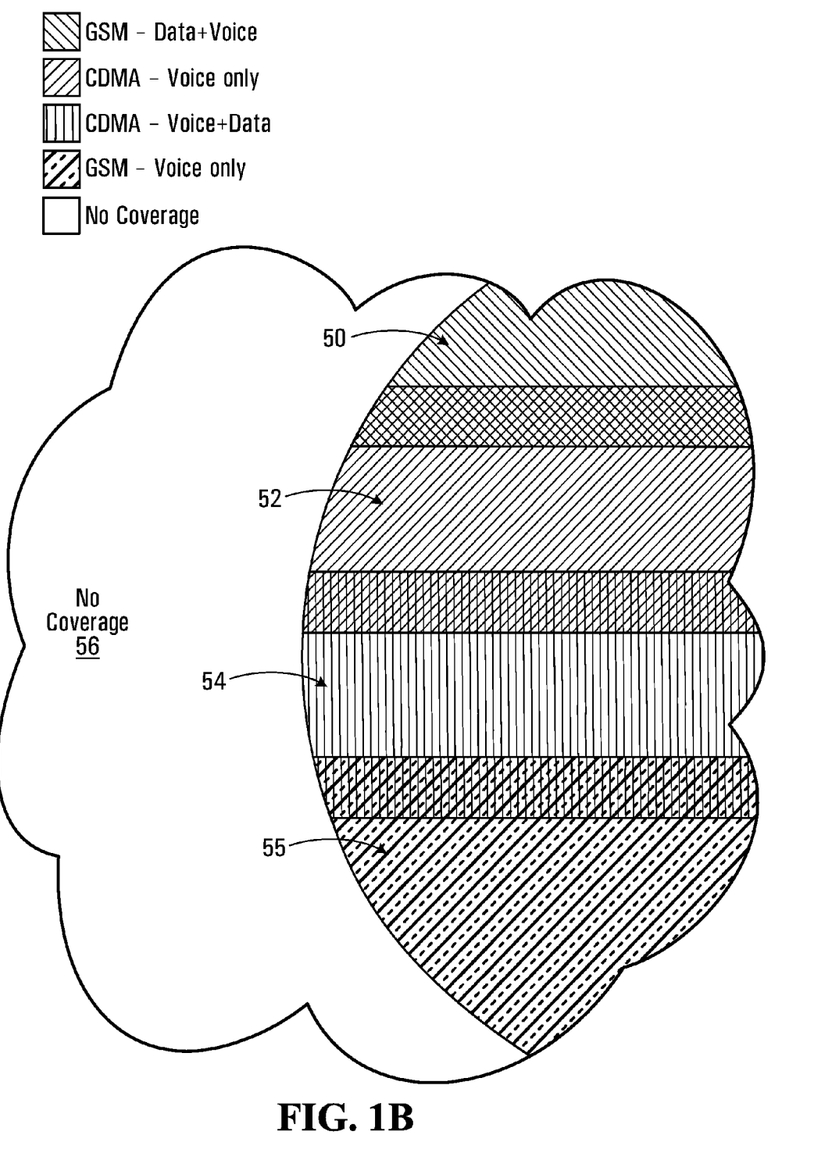
FIG. 1B is a schematic of an example geographical wireless network deployment that includes both CDMA and GSM.

In operation, the mobile device 10 attempts to acquire a wireless network (not shown) that can provide communication capabilities for the mobile device 10. The mobile device 10 can communicate with wireless networks using its wireless access radio 16 provided that the wireless network coverage is available in the geographical area in which the mobile device 10 resides. The particular wireless network or wireless networks and associated RAT (such as CDMA, GSM) available in a particular geographical area depend upon which have been deployed and are therefore available. For the purposes of this description, a very specific geographical wireless network deployment is assumed as depicted in FIG. 1B. However, it is to be understood that other geographical wireless network deployments are possible.

Referring now to FIG. 1B, shown is a wireless network deployment in which there is an area 50 served by a GSM wireless network (not shown) providing data and voice coverage, an area 52 in which CDMA voice-only coverage is available from a CDMA wireless network (not shown), an area 54 in which CDMA voice and data coverage is available from a CDMA wireless network (not shown), an area 55 in which GSM voice-only coverage is available from a GSM wireless network (not shown), and an area 56 in which there is no coverage. It can be seen that there is an overlap between coverage areas 50,52, between coverage areas 52,54, and between coverage areas 54,55.

The mobile device 10 might move from an area in which it had partial service in a GSM wireless network to another area in which better services are available in a CDMA wireless network. With reference to FIG. 1B, this would occur should the mobile device 10 move from area 55 to area 54. Similarly, the mobile device 10 might be in GSM coverage that denies service to the mobile device due to subscription issues although the wireless network is capable of such services, but the mobile device still finds a CDMA system that provides better service in the same area. With reference to FIG. 1B, this would occur should the mobile device 10 first select GSM RAT in overlapping area between 50 and 52, and then select CDMA RAT upon entering limited service state in GSM. Also, the mobile device 10 might move from an area in which it had no services to another area in which services are available. With reference to FIG. 1B, this would occur should the mobile device 10 move from area 56 to any one of areas 50,52,54,55.

According to an embodiment of the application, the RAT integration function 15 implements a method in the mobile device 10 to automatically scan for both GSM wireless networks and CDMA wireless networks in order to acquire a wireless network that can provide a service that is not currently provided to the mobile device 10. Therefore, the mobile device avoids partial service or limited service when better service is available. Further details are provided with reference to FIGS. 2 through 8.

In the illustrated example, the RAT integration function 15 of the mobile device 10 is implemented as software and is executed on the processor 17. However, more generally, the RAT integration function 15 may be implemented as software, hardware, firmware, or any appropriate combination thereof.

Another Mobile Device

Figure 1C:
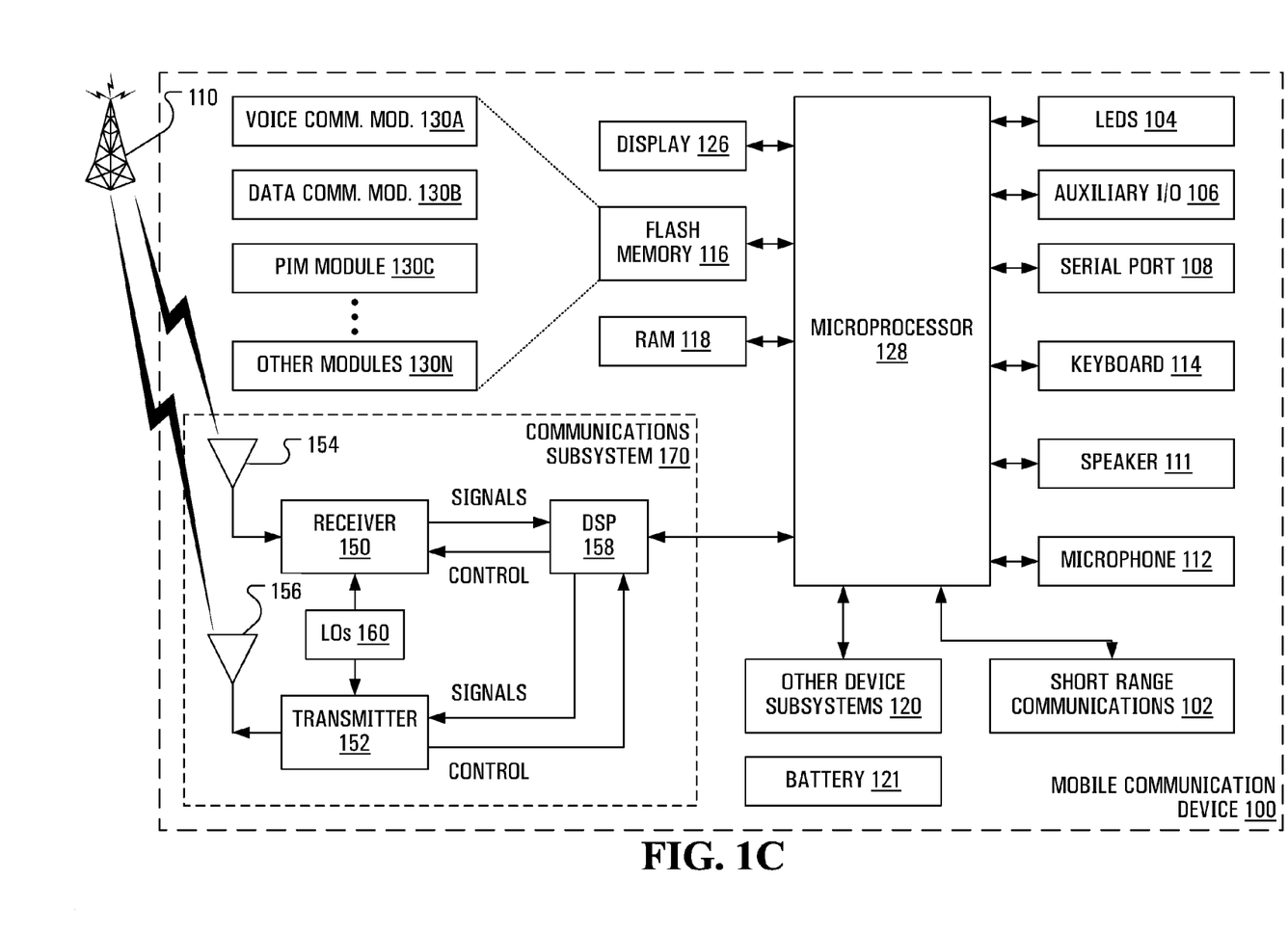
FIG. 1C is a block diagram of another mobile device.

Referring now to FIG. 1C, shown is a block diagram of another mobile device 100 that may implement any of the mobile device methods described herein. The mobile device 100 is shown with specific components for implementing features similar to those of the mobile device 10 of FIG. 1A. It is to be understood that the mobile device 100 is shown with very specific details for example purposes only.

A processing device (a microprocessor 128) is shown schematically as coupled between a keyboard 114 and a display 126. The microprocessor 128 is a type of processor with features similar to those of the processor 17 of the mobile device 10 shown in FIG. 1A. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 170. The communication subsystem 170 includes a receiver 150, a transmitter 152 and one or more antennas, illustrated as a receive antenna 154 and a transmit antenna 156. The communication subsystem 170 is configured based on the RAT (e.g. CDMA or GSM) selected by the microprocessor 128. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 16 of the mobile device 10 shown in FIG. 1A. One or more of the modules 150, 160, 152, 158 can be configured for RAT searching and acquisition as per instruction from microprocessor 128 in order to provide functionality similar to that of the RAT integration function 15 of the mobile device 10 shown in FIG. 1A. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 100.

Wireless network access may vary depending upon the type of communication system. For example, in the Mobitex™ and DataTAC™ wireless networks, mobile devices are registered on the wireless network using a unique Personal Identification Number (PIN) associated with each device. In GPRS wireless networks, however, wireless network access is typically associated with a subscriber or user of a device. A GPRS device therefore typically has a subscriber identity module, commonly referred to as a Subscriber Identity Module (SIM) card, in order to operate on a GPRS wireless network.

When wireless network registration or activation procedures have been completed, the mobile device 100 may send and receive communication signals over the wireless network 110. Signals received from the wireless network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the wireless network 110 are processed (e.g., modulated and encoded) by the DSP 158 and are then provided to the transmitter 152 for digital to analog conversion, frequency up conversion, filtering, amplification and transmission to the wireless network 110 (or wireless networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the wireless network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

Mobile Device Methods

Referring now to FIGS. 2 through 6, shown are flowcharts of example methods of automatically scanning for both GSM wireless networks and CDMA wireless networks. These methods may each be implemented in a mobile device, for example by the RAT integration function 15 of the mobile device 10 shown in FIG. 1A. Alternatively, these methods may be implemented in the mobile device 100 shown in FIG. 1C. More generally, these methods may be implemented in any appropriate communications device. These methods may be implemented separately, or in any appropriate combination.

Figure 2:
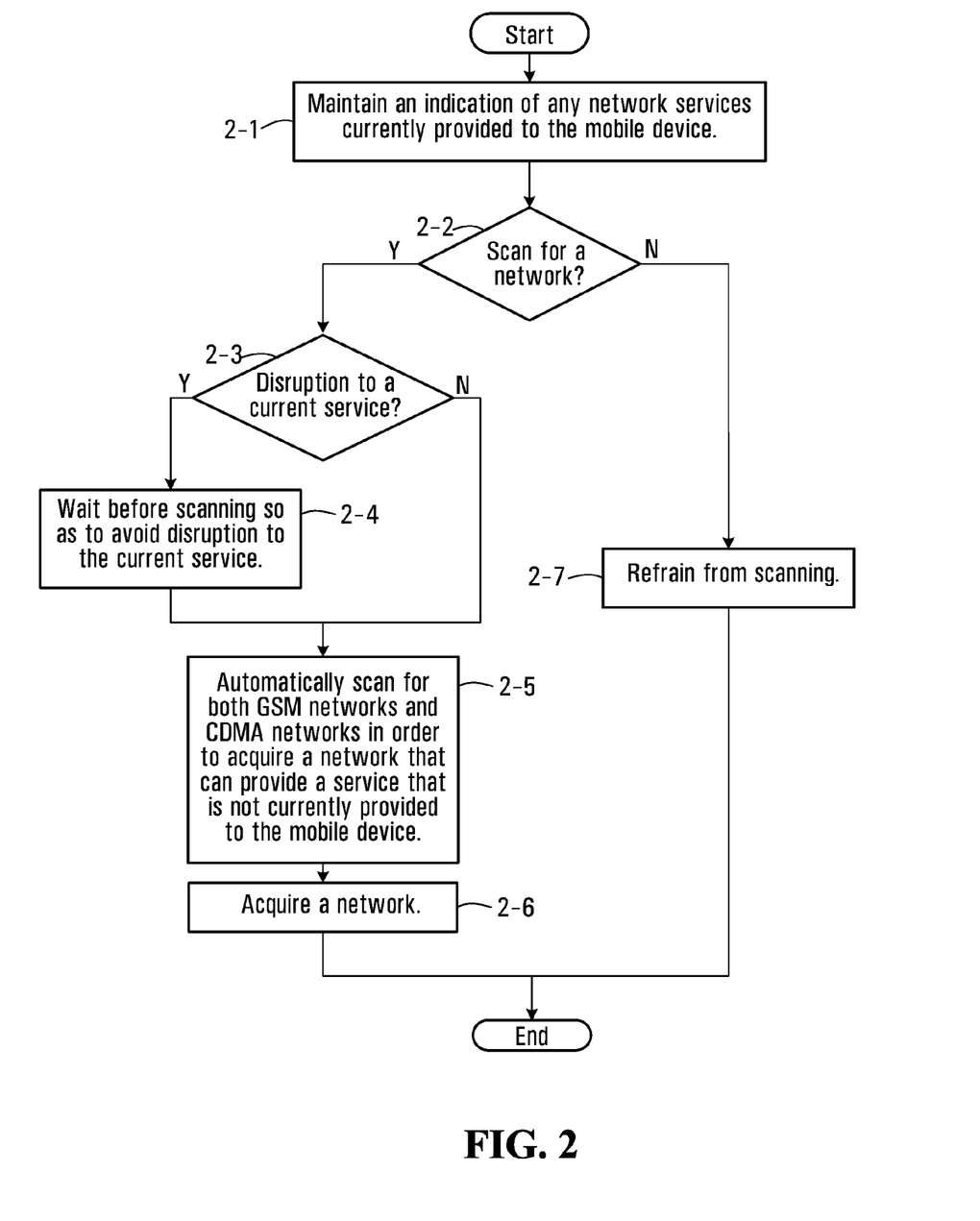
FIGS. 2 through 6 are flowcharts of example methods of automatically scanning for both GSM wireless networks and CDMA wireless networks.
Figure 3:
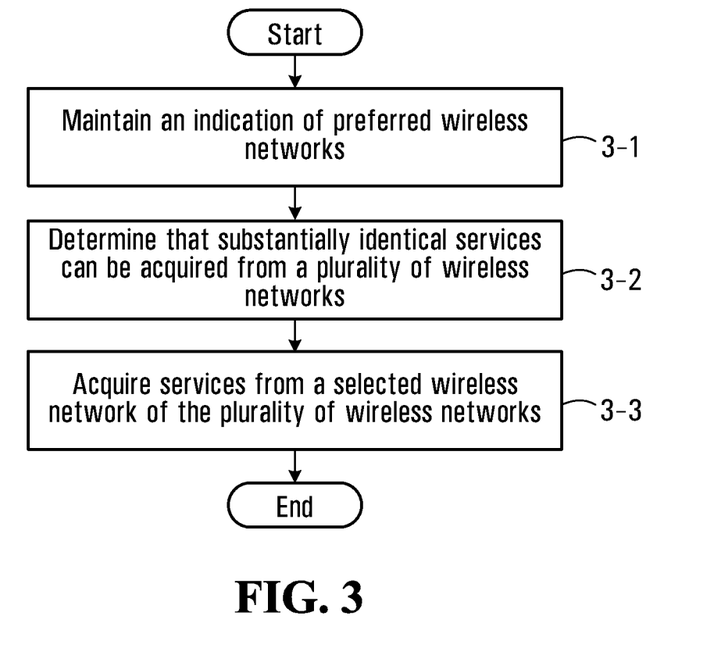

Referring first to FIG. 2, at step 2-1 the mobile device maintains an indication of any wireless network services currently provided to the mobile device. There may be no wireless network service, for example if the mobile device is in an area in which there is no wireless coverage. However, if the mobile device has acquired a wireless network, then the service provided by the wireless network might for example include one or more of circuit switched service and packet switched service. At step 2-2, the mobile device automatically determines whether to scan for a wireless network. In this example, the determination is based on the indication of wireless network service capability and the status of requested services granted by the wireless network. For instance, if the mobile device is granted only circuit switched service, then the mobile device might automatically attempt to scan for other wireless networks regardless of RAT that can provide packet switched service in addition to circuit switched service if one of the primary applications on the mobile device uses packet-switched service.

If the mobile device is to scan for a wireless network, then at step 2-3 the mobile device determines whether the scanning would result in disruption to a current service. Accordingly, if the scanning would result in disruption to a current service, then the mobile device waits at step 2-4 before scanning so as to avoid disruption to the current service. For example, the mobile device might start scanning only when the mobile device is not monitoring its paging cycle. In other implementations, the mobile device does not bother waiting before scanning and proceeds directly to step 2-5. At step 2-5, the mobile device automatically scans for both GSM wireless networks and CDMA wireless networks in order to acquire a wireless network that can provide a service that is not currently provided to the mobile device. In the event that the scanning results in the discovery of a wireless network that can provide a service that is not currently provided to the mobile device, then the mobile device acquires the wireless network at step 2-6. The wireless network that is acquired can be either one of a GSM wireless network and a CDMA wireless network because the mobile device scans for both GSM wireless networks and CDMA wireless networks.

If the mobile device is not to scan for a wireless network, then at step 2-7 the mobile device refrains from automatic scanning. The mobile device does not scan for a wireless network because it has determined that the wireless network services currently provided to the mobile device are satisfactory. For example, the mobile device might have both circuit switched service and packet switched service.

In some implementations, the determination at step 2-2 is also based on whether the mobile device prefers one network to another. The mobile device might for example favour a home wireless network over a roaming wireless network in the event that substantially identical services can be acquired from the two wireless networks. An example of how the mobile device might select between a plurality of wireless networks when they provide substantially identical service is provided with reference to FIG. 3. At step 3-1 the mobile device maintains an indication of preferred wireless networks of a given RAT. This might for example include information stored in the PRL in case of CDMA RAT and/or the PLMN list in case of GSM RAT. If at step 3-2 the mobile device determines that substantially identical services can be acquired from each of a plurality of wireless networks, then at step 3-3 the mobile device acquires services from a selected wireless network of the plurality of wireless networks. The selected wireless network is selected based on the indication of preferred wireless networks. For instance, the mobile device might select a wireless network based on the PRL and/or the PLMN list.

In some implementations, the mobile device determines how to perform the scanning based on maintained history information of acquired wireless networks. An example is provided with reference to FIG. 4. At step 4-1, the mobile device maintains history information for wireless networks that the mobile device has acquired. Based on the history information, the mobile device determines at step 4-2 how to initiate scanning in terms of scanning frequency and/or scanning order. The scanning is therefore executed according to the scanning frequency and scanning order. Further details of the scanning in terms of scanning frequency and/or scanning order are provided below.

Figure 4:
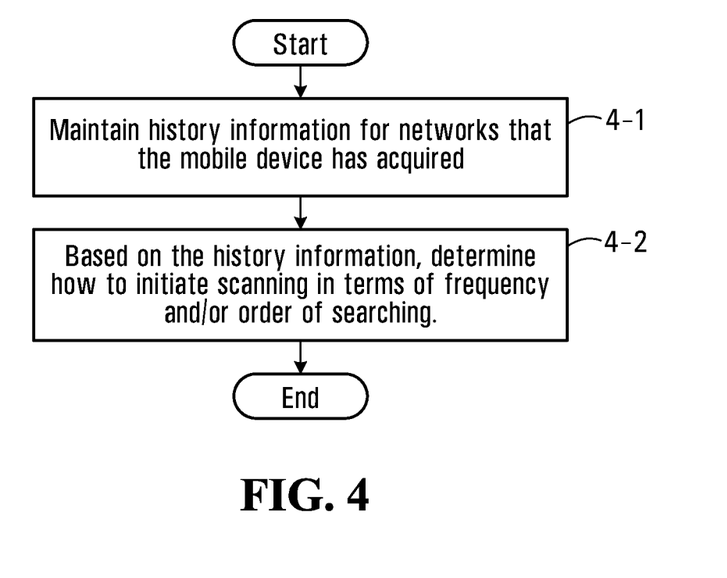

There are many ways for the mobile device to scan for one or more RATs based on the history information. In some implementations, upon an event triggering initial acquisition of services, the mobile device determines that the scanning order is to begin with a same RAT as the wireless network from which the mobile device last acquired service. For example, if the RAT of the wireless network from which the mobile device last acquired service is GSM, then the scanning order might for example be GSM, CDMA, GSM, CDMA, . . . . Note that this scanning order starts with GSM because the RAT of the wireless network from which the mobile device last acquired service is GSM. The event triggering initial acquisition of services might for example be the mobile device being powered on or the mobile device entering an overlay coverage area. In some implementations, the mobile device determines whether it has entered an overlay coverage area.

In some implementations, the scanning frequencies for GSM and CDMA are based on the RAT of the wireless network from which the mobile device last acquired service. For example, if the RAT of the wireless network from which the mobile device last acquired service is GSM, then the scanning order might for example be GSM, GSM, CDMA, GSM, GSM, CDMA, . . . Note that this scanning order involves scanning for GSM twice as frequent as CDMA. In some implementations, the mobile device might perform multiple GSM scans followed by alternate GSM and CDMA scans. Similarly, the mobile device might scan for CDMA wireless networks more frequently than GSM wireless networks if the RAT of the wireless network from which the mobile device last acquired service is CDMA. Other implementations are possible.

In some implementations, scanning of GSM wireless networks and CDMA wireless networks involves a back-off timer. A back-off timer can be used in order to reduce the frequency of scanning over time so that unnecessary scanning is reduced. Reducing the frequency of scanning helps conserve resources, such as battery resources of the mobile device. For example, the time between scans can be based on the back-off timer, which is initially set to a small value. With each subsequent scan, the back-off timer is incremented so that the time between scans becomes greater. Once the back-off timer approaches a predefined saturation limit, then the back-off timer is not incremented. The back-off timer might be reset to the small value upon certain events, for example by the mobile device acquiring a new wireless network or being powered on.

In the examples described above, the history information includes the RAT of the wireless network from which the mobile device last acquired service. These examples demonstrate how the scanning might be based on the RAT of the wireless network from which the mobile device last acquired service. However, it is to be understood that there are other possibilities for the history information. Accordingly, there are other possibilities for the scanning based on the history information. A detailed example for the history information is provided below with reference to FIG. 7.

Figure 7:
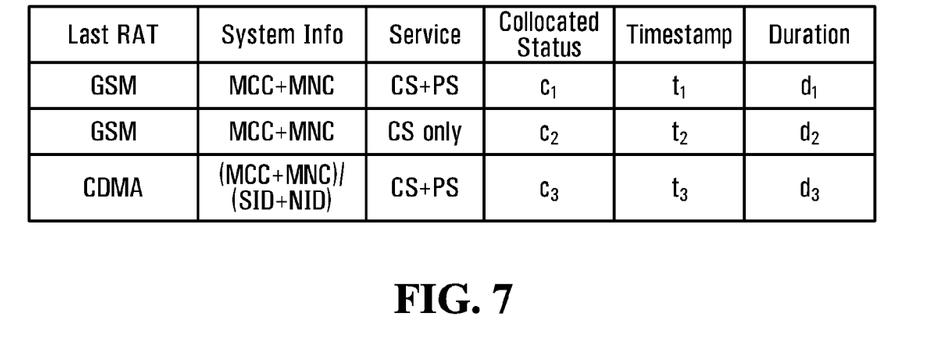
FIG. 7 is a chart providing example history information for wireless networks that the mobile device has acquired.

Referring now to FIG. 7, shown is a chart providing example history information for wireless networks that the mobile device has acquired. In this example, the history information includes an indication of RAT (e.g. GSM or CDMA), system identification information (e.g. Mobile Country Code and Mobile Network Code pair and/or System Identifier and Network Identifier pair), level/type of service (e.g. limited service, circuit switched and/or packet switched), collocation status (i.e. overlay information for RATs), time-stamp, and duration. More generally, the history information may include any information concerning wireless networks that the mobile device has acquired.

In the chart shown in FIG. 7, the history information includes three entries. More generally, the history information may include one or more entries. The number of entries may be predetermined, or variable based on some criteria. When a wireless network is acquired and attempts are made by the mobile device to acquire service, a new entry is entered into the table for the wireless network. In some implementations, the mobile device determines based on the time-stamps whether some entries are old and removes those entries from the table. In some implementations, the mobile device clears the history information upon certain events, such as power-up of the mobile device. In other implementations, the mobile device maintains the history information in spite of events such as power-up of the mobile device. Other implementations are possible.

As noted above, the services provided to the mobile device depend on the core wireless network associated with the RAT acquired by the mobile device. The mobile device determines which services are provided by the wireless network that has been acquired. Based on service limitations (if any), the mobile device scans for a better wireless network that can provide services that are not provided by the current wireless network. Example implementations are provided below with reference to FIGS. 5A through 5C. Other implementations are possible.

Figure 5A:
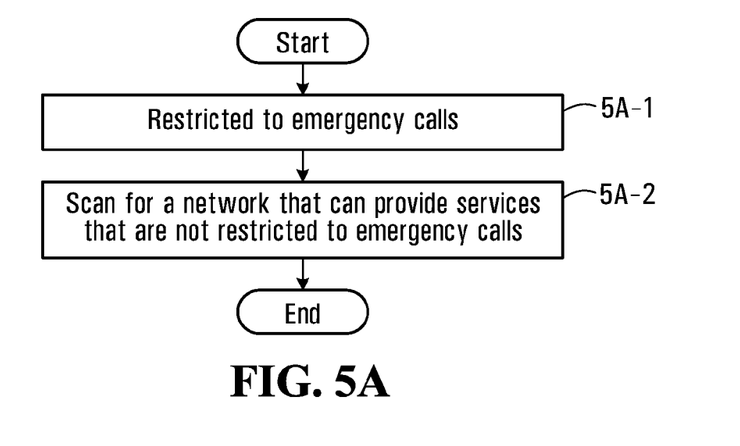

Referring first to FIG. 5A, at step 5A-1 the mobile device determines whether any services that are currently provided to the mobile device are restricted to emergency calls. For example, if the mobile device requests certain non-emergency service and receives a response from the wireless network indicating denial of all services but emergency calls, then the mobile device determines that the services are restricted to emergency calls. The response might for example include a critical cause code indicating that the device is to treat the wireless network as a forbidden wireless network and services offered by the wireless network are limited to emergency calls. If the services are restricted to emergency calls, then at step 5A-2 the mobile device scans for a wireless network that can provide services that are not restricted to emergency calls.

Figure 5B:
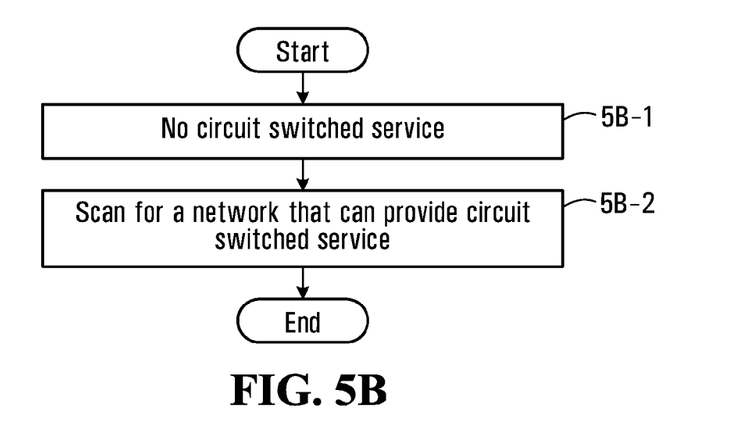

Referring now to FIG. 5B, at step 5B-1 the mobile device determines whether the services that are currently provided to the mobile device do not include circuit switched service. For example, if the mobile device attempts to register for circuit-switched service or requests a circuit switched service and receives a response from the wireless network indicating that the request has not been fulfilled, then the mobile device determines that the circuit switched service is not provided to the mobile device. The response might for example include a critical cause code indicating rejection of circuit switched service. If the services that are currently provided to the mobile device do not include circuit switched service, then at step 5B-2 the mobile device scans for a wireless network that can provide circuit switched service.

Figure 5C:
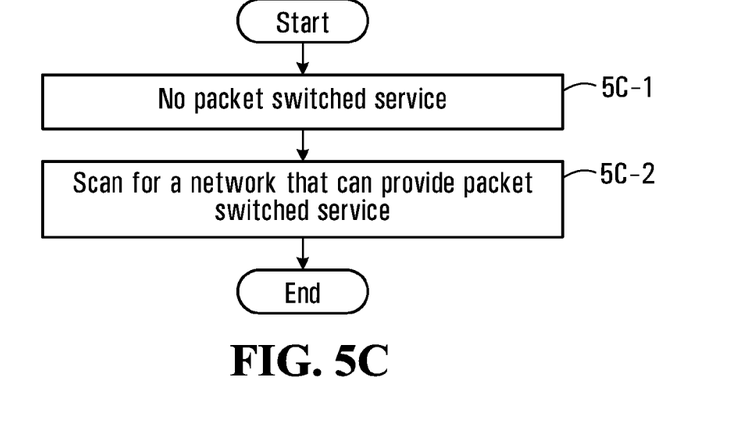

Referring now to FIG. 5C, at step 5C-1 the mobile device determines whether the services that are currently provided to the mobile device do not include packet switched service. For example, if the mobile device requests a packet switched service and receives a response from the wireless network indicating that the request has not been fulfilled, then the mobile device determines that the packet switched service is not provided to the mobile device. The response might for example include a critical cause code indicating rejection of packet switched service. If the services that are currently provided to the mobile device do not include packet switched service, then at step 5C-2 the mobile device scans for a wireless network that can provide packet switched service.

In some implementations, scanning for both GSM wireless networks and CDMA wireless networks involves a bias towards one of GSM wireless networks and CDMA wireless networks. A bias might be imposed for example because the mobile device determines that successfully acquiring services via one RAT is more likely than successfully acquiring services via another RAT. Example implementations for imposing a bias are provided below with reference to FIGS. 6A and 6B.

Figure 6A:
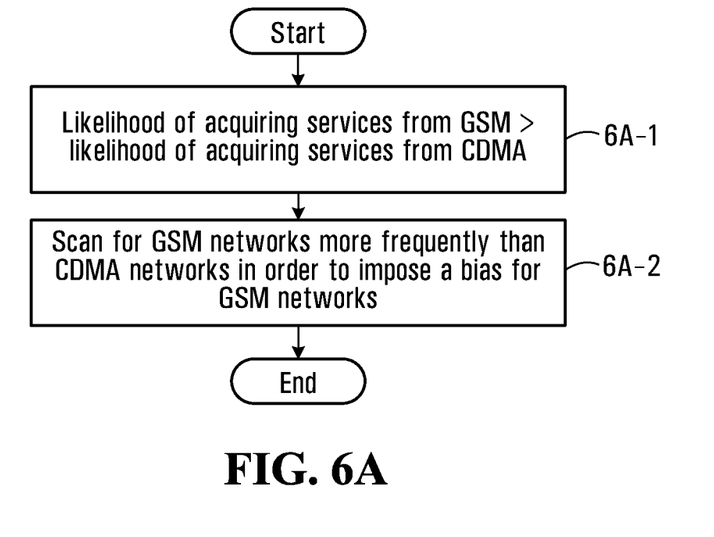

Referring first to FIG. 6A, if at step 6A-1 the mobile device determines that the likelihood of successfully acquiring services from a GSM wireless network is greater than the likelihood of successfully acquiring services from a CDMA wireless network, then at step 6A-2 the mobile device scans for GSM wireless networks more frequently than CDMA wireless networks in order to impose a bias for GSM wireless networks. The scanning might have a scanning order such as GSM, GSM, CDMA, GSM, GSM, CDMA, . . . Note that this scan order starts with GSM and scans for GSM twice as frequent as CDMA. Other scanning orders are possible. The mobile device might perform the determination at step 6A-1 for example if the RAT of the wireless network from which the mobile device last acquired service was GSM.

Figure 6B:
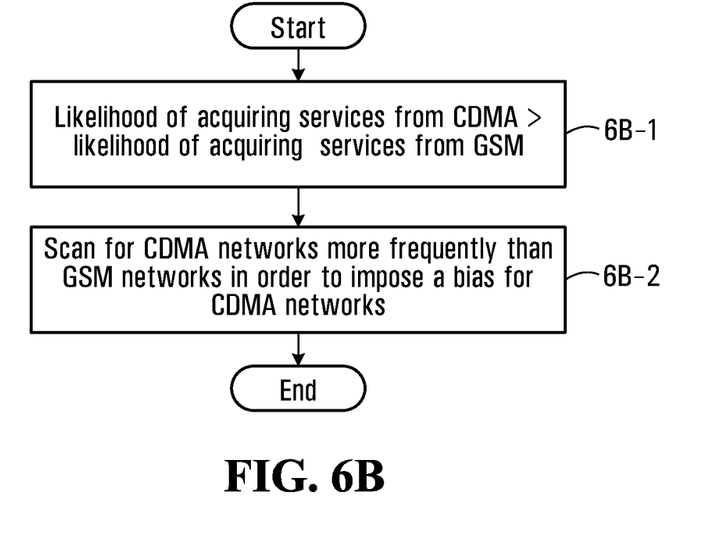

In other instances, the mobile device might impose a bias towards CDMA. An example of this is shown in FIG. 6B-1. If at step 6B-1 the mobile device determines that the likelihood of successfully acquiring services from a CDMA wireless network is greater than the likelihood of successfully acquiring services from a GSM wireless network, then at step 6B-2 the mobile device scans for CDMA wireless networks more frequently than GSM wireless networks in order to impose a bias for CDMA wireless networks. The scanning might have an order such as CDMA, CDMA, GSM, CDMA, CDMA, GSM, . . . Note that this scan order starts with CDMA and scans for CDMA twice as frequent as GSM. Other scanning orders are possible. The mobile device might perform the determination at step 6A-1 for example if the RAT of the wireless network from which the mobile device last acquired service was CDMA.

Another Mobile Device Method

Figure 8A:
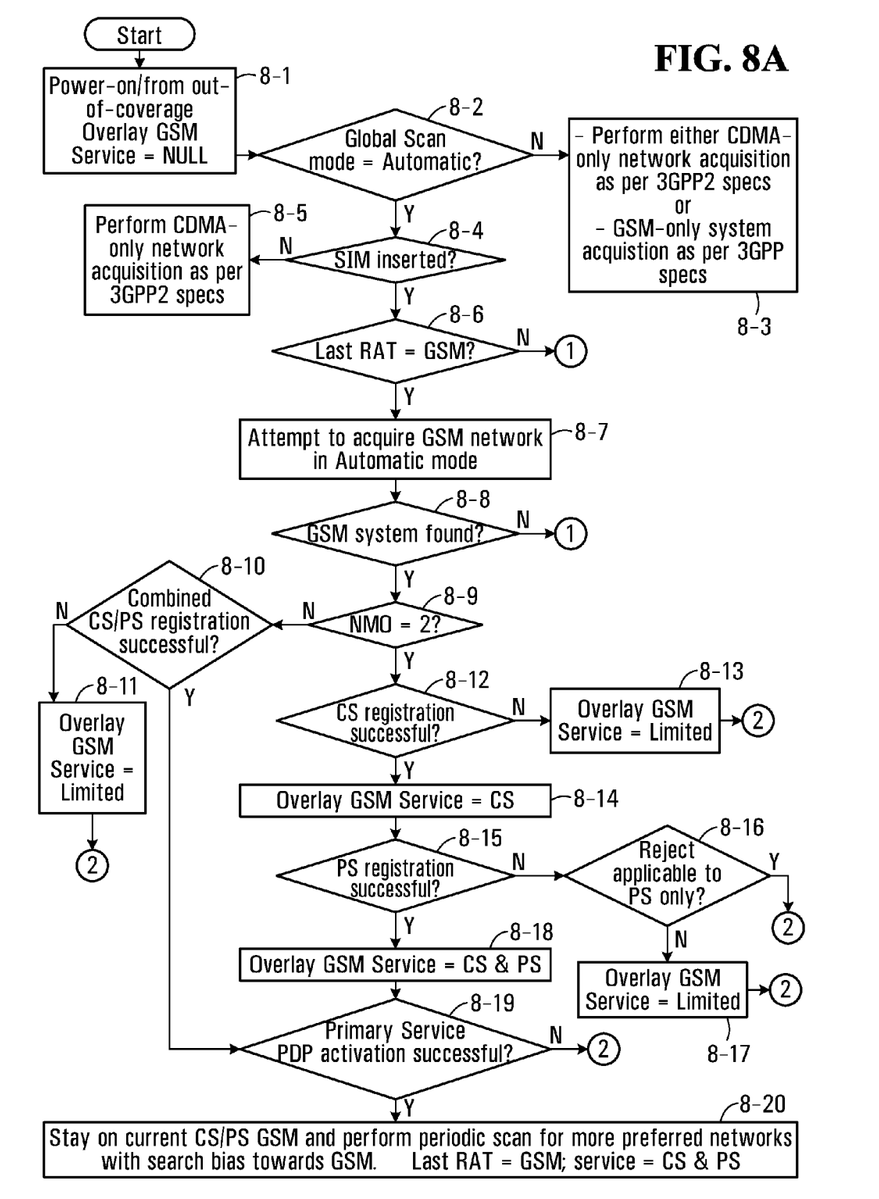
FIG. 8 is a flowchart of an example method of performing integrated access to GSM and CDMA wireless networks.
Figure 8B:
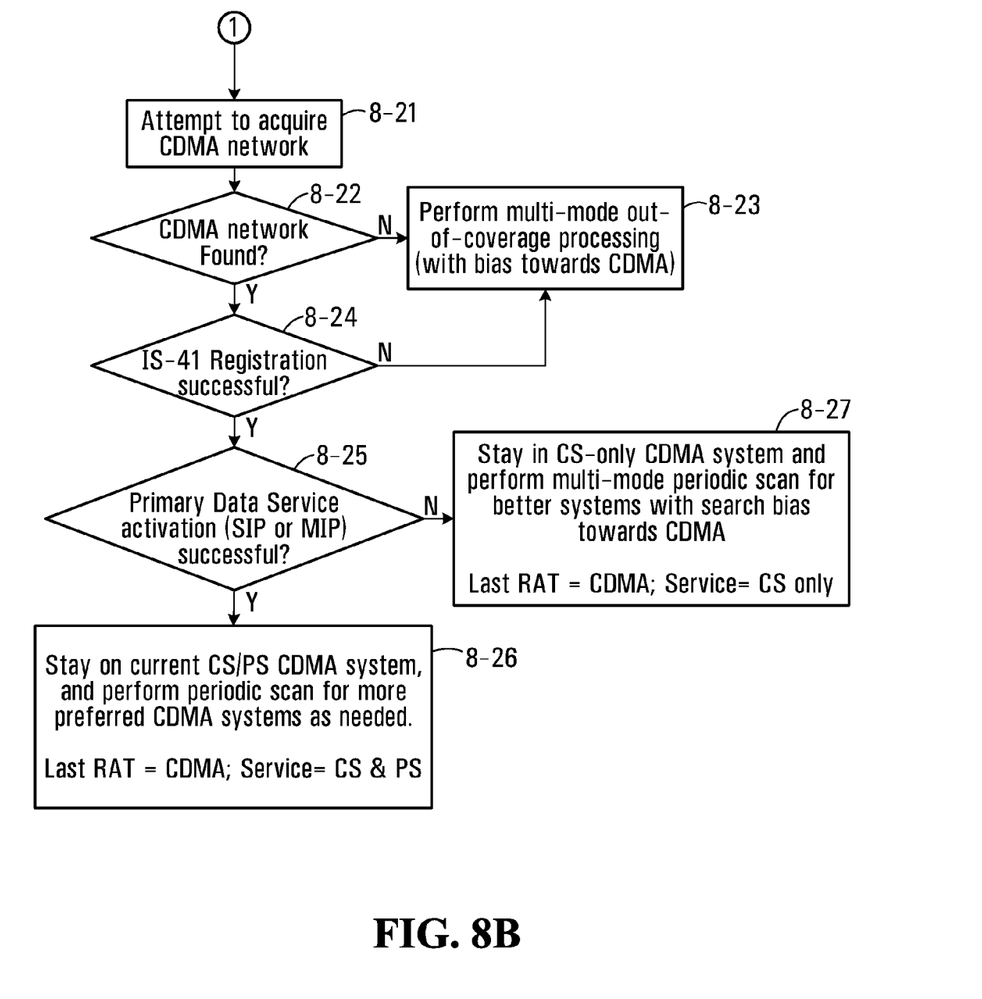
Figure 8C:
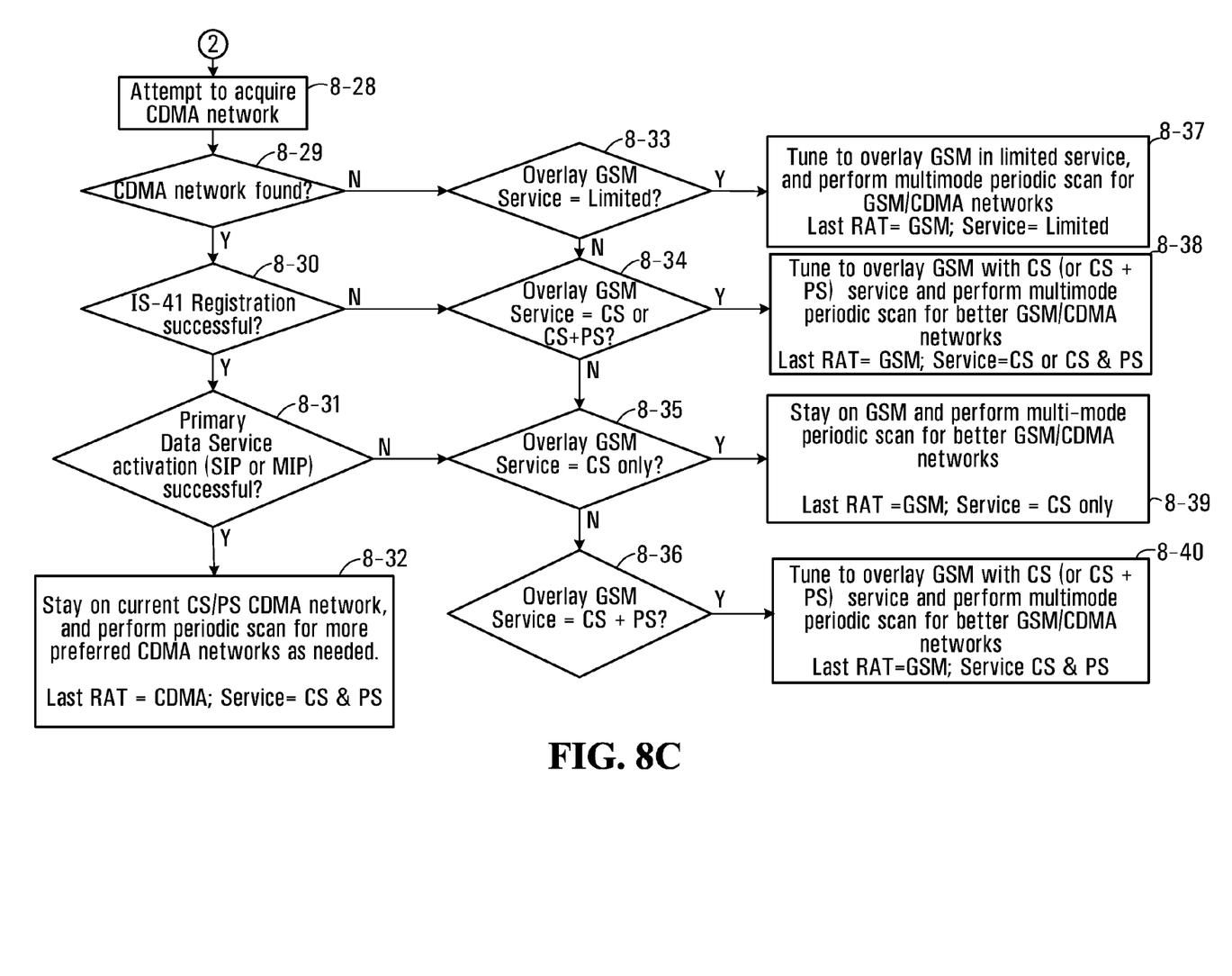

Referring now to FIG. 8, shown is a flowchart of an example method of performing integrated access to GSM and CDMA wireless networks. This method may be implemented in a mobile device, for example by the RAT integration function 15 of the mobile device 10 shown in FIG. 1A. Alternatively, this method may be implemented in the mobile device 100 shown in FIG. 1C. More generally, this method may be implemented in any appropriate communications device. It is to be understood that this is a very specific method for example purposes only.

The method is started at step 8-1 by the mobile device being powered on, or by the mobile device moving into an area with coverage from an out of coverage area. At step 8-2, the mobile device determines whether a global scan mode is automatic. Global scan mode is a new integrated scanning approach provided herein. The global scan mode can be set to "automatic" to indicate that is shall always be performed. By setting it to "manual", the global scan mode is not executed. Rather, conventional scanning is performed as indicated at step 8-3.

If the global scan mode is set to "manual", then at step 8-3 the mobile device performs either CDMA-only wireless network acquisition according to the 3GPP2 specification (TIA-683), or GSM-only wireless network acquisition according to the 3GPP specification (TS 23.122). However, if the global scan mode is set to "automatic", then at step 8-4 the mobile device determines whether the mobile device has a SIM (Subscriber Identity Module) card, which is used for GSM services. If there is no SIM card, then at step 8-5 the mobile device performs CDMA-only wireless network acquisition according to the 3GPP2 specification. However, if there is a SIM card, then the mobile device is capable of GSM wireless network acquisition in addition to CDMA wireless network acquisition and processing continues starting at step 8-6.

At step 8-6, the mobile device determines which RAT was last used so that the mobile device can first scan for a wireless network using that RAT. If the mobile device has an indication that the last RAT obtained is CDMA, then processing continues at step 8-21 in which the mobile device attempts to acquire a CDMA wireless network, details of which are provided below. However, if the mobile device has an indication that the last RAT obtained is GSM, then at step 8-7 the mobile device attempts to acquire a GSM wireless network. If at step 8-8 the mobile device finds a GSM wireless network, then at step 8-9 the mobile device determines the value of the GSM wireless network mode operation (NMO) from the broadcast channel. The NMO determines whether circuit switched registration and packet switched registration are to be performed in a combined manner or separately according to 3GPP specifications (TS 24.008).

If NMO is equal to one, then circuit switched registration and packet switched registration are combined. At step 8-10 the mobile device determines whether combined circuit switched and packet switched registration is successful. If the combined circuit switched and packet switched registration is not successful, then the mobile device determines that GSM wireless network only provides limited emergency-only service at step 8-11. For instance, the mobile device might not be provided with packet switched capabilities. Therefore, processing continues at step 8-28 in which the mobile device attempts to acquire a CDMA wireless network in order to obtain more communication capabilities; further details are provided below. However, if the combined circuit switched and packet switched registration is successful, then processing continues at step 8-19, details of which are provided below.

If NMO is equal to two, then circuit switched registration and packet switched registration are separate. At step 8-12 the mobile device determines whether circuit switched registration is successful. If circuit switched registration is not successful, then at step 8-13 overlay GSM service is not full. Therefore, processing continues at step 8-28 in which the mobile device attempts to acquire a CDMA wireless network in order to obtain more communication capabilities; further details are provided below. However, if circuit switched registration is successful, then at step 8-14 the mobile device determines that overlay GSM service includes circuit switched capabilities. At step 8-15, the mobile device determines whether packet switched registration is successful. If packet switched registration is not successful, then at step 8-16 the mobile device determines whether the reject is applicable to only the packet switched registration. This is to verify that the circuit switched registration is still valid. If the reject also applies to the circuit switched registration, then at step 8-17 the mobile device determines that the overlay GSM service is not full because there is neither circuit switched registration nor packet switched registration. In any event, processing continues at step 8-28 in which the mobile device attempts to acquire a CDMA wireless network in order to obtain more communication capabilities; further details are provided below. However, if at step 8-15 packet switched registration is successful, then at step 8-18 the mobile device determines that overlay GSM service includes both circuit switched and packet switched capabilities.

At step 8-19 the mobile device should have both circuit switched registration and packet switched registration. The mobile device determines whether PDP activation process for it primary packet data service is successful. Primary service PDP activation is used to establish a PDP context, which is used for packet communication with external application servers. If the primary service PDP activation is not successful, then processing continues at step 8-28 in which the mobile device attempts to acquire a CDMA wireless network in order to obtain more communication capabilities; further details are provided below. However, if the primary service PDP activation is successful, then at step 8-20 the mobile device stays on the current GSM wireless network, but performs periodic scans for more preferred wireless networks with search bias towards GSM. The mobile device maintains the indication that the last RAT obtained is GSM.

At step 8-21, the mobile device attempts to acquire a CDMA wireless network because either the indication of the last RAT obtained is CDMA at step 8-6 or the mobile device cannot find a GSM wireless network at step 8-8. If at step 8-22 the mobile device does not find a CDMA wireless network, then at step 8-23 the mobile device performs multi-mode out of coverage processing with a bias towards CDMA. This involves the mobile device periodically searching for both GSM and CDMA wireless networks. However, if at step 8-22 the mobile device does find a CDMA wireless network, then at step 8-24 the mobile device determines whether IS-41 registration is successful. IS-41 registration is performed for identification and authentication purposes in CDMA wireless network. If IS-41 registration is not successful, then at step 8-23 the mobile device performs multi-mode out of coverage processing with a bias towards CDMA. However, if IS-41 registration is successful, then at step 2-25 the mobile determines whether primary packet data service activation is successful. The primary data service activation may be for either SIP (Simple Internet Protocol) or MIP (Mobile Internet Protocol) wireless IP network as per 3GPP2 specifications TIA-835. If the primary data service activation is successful, then at step 8-26 the mobile device stays with the current CDMA wireless network, but performs periodic scans for more preferred CDMA wireless networks as appropriate. The mobile device also maintains the indication that the last RAT obtained is CDMA. However, if the primary data service activation is not successful, then at step 8-27 the mobile device stays with current CDMA wireless network, but performs a multi-mode periodic scan for better wireless networks with a search bias towards CDMA. The mobile device also maintains the indication that the last RAT obtained is CDMA.

At step 8-28, the mobile device attempts to acquire a CDMA wireless network because capabilities provided by the GSM wireless network are limited. If at step 8-29 the mobile device finds a CDMA wireless network, then at step 8-30 the mobile device determines whether IS-41 registration is successful. If the IS-41 registration is successful, then at step 8-31 the mobile determines whether primary data service activation is successful. The primary data service activation may be for either SIP or MIP wireless IP network as defined in 3GPP2 specifications IS-835. If the primary data service activation is successful, then at step 8-32 the mobile device stays with the current CDMA wireless network, but performs periodic scans for more preferred CDMA wireless networks as appropriate. The mobile device also maintains the indication that the last RAT obtained is CDMA.

Note that if a CDMA wireless network is not found at step 8-29, IS-41 registration is not successful at step 8-30, or primary data service activation is not successful at step 8-31, then the mobile device will re-acquire the GSM wireless network and perform multi-mode periodic scans for better GSM/CDMA wireless networks at one of steps 8-37, 8-38, 8-39, and 8-40. For instance, if at step 8-33 the mobile device determines that overlay GSM service is limited, then at step 8-37 the mobile device tunes back to overlay GSM wireless network, stays in limited service mode and performs multi-mode periodic scans for GSM/CDMA wireless networks in order to acquire services that are not limited to just emergency calls. If at step 8-34 the mobile device determines that overlay GSM service includes circuit switched service or both circuit switched service and packet switched service, then at step 8-38 the mobile device tunes to overlay GSM with circuit switched service (or both circuit switched service and packet switched service) and performs multi-mode periodic scans for GSM/CDMA wireless networks in order to acquire a better wireless network. If at step 8-35 the mobile device determines that overlay GSM service includes only circuit switched service, then at step 8-39 the mobile device stays on GSM and performs multi-mode periodic scans for GSM/CDMA wireless networks in order to acquire a better wireless network. If at step 8-36 the mobile device determines that overlay GSM service includes both circuit switched service and packet switched service, then at step 8-40 the mobile device tunes to overlay GSM with circuit switched service (or both circuit switched service and packet switched service) and performs multi-mode periodic scans for GSM/CDMA wireless networks in order to acquire a better wireless network.

Numerous modifications and variations of the present application are possible in light of the above teachings. It is therefore to be understood that within the scope of the appended claims, the application may be practised otherwise than as specifically described herein.

We claim:

1. A method at a multi-mode mobile device comprising:
   requesting services from a network servicing the mobile device;
   comparing services granted by the network servicing the mobile device with services requested by the mobile device; and
   if the services requested by the mobile device requirements are not granted by the network servicing the mobile device,
      performing a scan for other networks, said scan being performed over a plurality of radio access technology modes having different access schemes wherein a radio access technology of a network on which the requested services were last acquired is scanned first; and
      acquiring a new network found by said scan if the new network grants the services requested by the mobile device.

2. The method of claim 1, wherein the plurality of radio access technology modes include Code Division Multiple Access and Global System for Mobile Communications.

3. The method of claim 1, wherein the services requested by the mobile device include both packet switched and circuit switched services.

4. The method of claim 1, wherein the services requested by the mobile device include making emergency calls.

5. The method of claim 1, wherein the services requested by the mobile device include preferences based on roaming agreements.

6. The method of claim 1, wherein the acquiring chooses the new network first based on services offered and secondly based on preference criteria.

7. The method of claim 1, wherein the preference criteria is a Public Land Mobile Network list or a preferred roaming list.

8. The method of claim 1, wherein the performing utilizes a list from a memory location within the mobile device, the list storing historical information for networks the mobile device has acquired.

9. The method of claim 1, further comprising reducing a frequency of scanning based on a back off timer.

10. The method of claim 1, wherein the scanning is performed in an order or frequency based on likelihood of success of the scan.

11. A multi-mode mobile device comprising:
    a processor; and
    a communications subsystem,
    wherein the processor and communications subsystem cooperate to:
       request services from a network servicing the mobile device;
       compare services granted by the network servicing the mobile device with the services requested by the mobile device; and
       if the services requested by the mobile device are not granted by the network servicing the mobile device,
          perform a scan for other networks, said scan being performed over a plurality of radio access technology modes having different access schemes wherein a radio access technology of a network on which the requested services were last acquired is scanned first; and
          acquire a new network found by said scan if the new network grants the services requested by the mobile device.

12. The mobile device of claim 11, wherein the plurality of radio access technology modes include Code Division Multiple Access and Global System for Mobile Communications.

13. The mobile device of claim 11, wherein the services requested by the mobile device include both packet switched and circuit switched services.

14. The mobile device of claim 11, wherein the services requested by the mobile device include making emergency calls.

15. The mobile device of claim 11, wherein the services requested by the mobile device include preferences based on roaming agreements.

16. The mobile device of claim 11, wherein the acquiring chooses the new network first based on services offered and secondly based on preference criteria.

17. The mobile device of claim 11, wherein the preference criteria is a Public Land Mobile Network list or a preferred roaming list.

18. The mobile device of claim 11, wherein the processor and communications subsystem are further configured to perform utilizing a list from a memory location within the mobile device, the list storing historical information for networks the mobile device has acquired.

19. The mobile device of claim 11, wherein the processor and communications subsystem are further configured to reduce a frequency of scanning based on a back off timer.

20. The mobile device of claim 11, wherein the scanning is performed in an order or frequency based on likelihood of success of the scan.

* * * * *